Oct. 30, 1923. 1,472,256
G. S. STRINGFIELD
MEANS FOR SHAPING RUBBER ARTICLES
Filed Sept. 29, 1921

INVENTOR
George S. Stringfield
by Damon S. Wolcott
Atty

Patented Oct. 30, 1923.

1,472,256

UNITED STATES PATENT OFFICE.

GEORGE S. STRINGFIELD, OF COLUMBUS, OHIO.

MEANS FOR SHAPING RUBBER ARTICLES.

Application filed September 29, 1921. Serial No. 504,058.

*To all whom it may concern:*

Be it known that I, GEORGE S. STRINGFIELD, residing at Columbus, in the county of Franklin and State of Ohio, a citizen of the United States, have invented or discovered certain new and useful Improvements in Means for Shaping Rubber Articles, of which improvements the following is a specification.

In the manufacture of toy balloons and other thin hollow articles from rubber, it is the practice to dip a suitably shaped mold or form into a solution of rubber and then into a curing solution. After these coatings have become properly set or cured, the completed article is stripped from the form. Experience has shown that the surface of the form must be very smooth and dense to permit of the stripping of the article. These qualities are found in glass and porcelain, but by reason of the shape of the form for balloons, etc., and the fragile character of the material, the loss by breakage is excessive.

It has been attempted to use forms made of different metal, wood, etc., alone or coated with shellac or an enamel, but for some reason the finished article cannot be stripped unless a suitable lubricant, such as glycerine, be applied to the surfaces of such forms before being dipped into the rubber solution. The time required for applying the lubricant increases the cost of production and further, a shellac surface is liable to checking, i. e., the formation of surface cracks into which the solution will enter. The enamel coating is somewhat brittle and liable to chipping, and when a portion of the surface is ruptured, the entire covering must be renewed.

The invention described herein has for its object the provision of a form having a capability of withstanding rough treatment and having a surface permitting the stripping of the finished article without the use of a lubricant. The invention is hereinafter more fully described and claimed.

Figure 1:
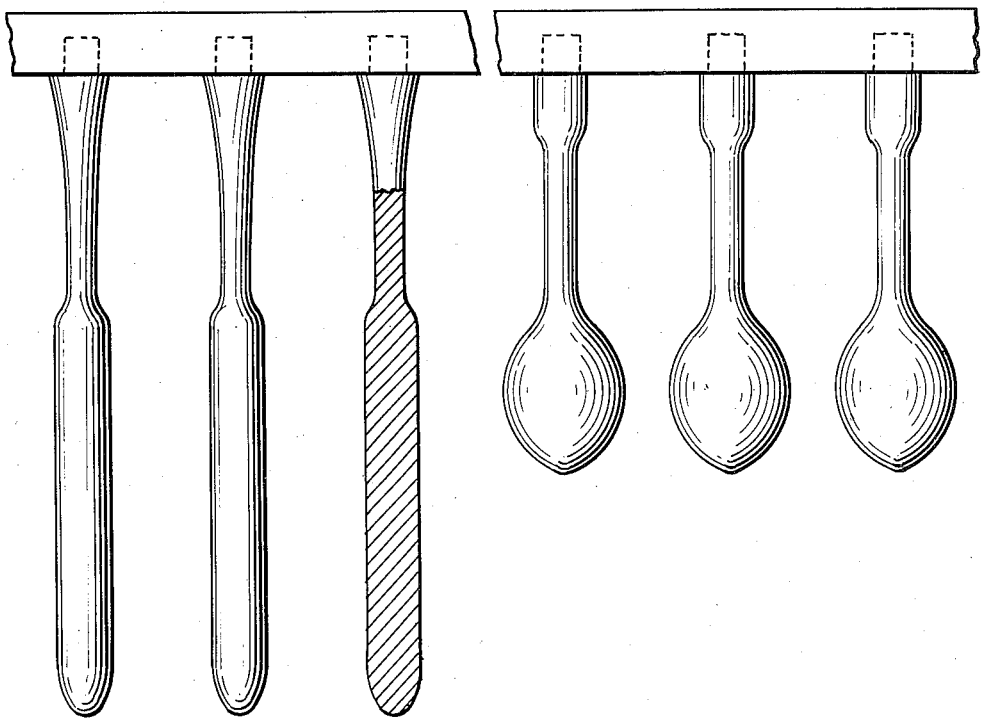
Figure 2:
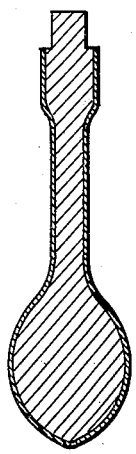
Figure 3:
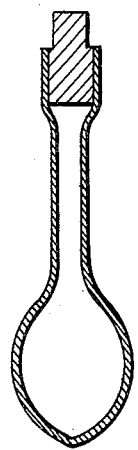

In the accompanying drawing forming a part of this specification, Fig. 1 is a perspective view of a number of forms for balloons, secured to a supporting base; Figs. 2 and 3 are sectional views showing different embodiments of the invention.

The improved form is made of pyroxylin plastic. This material can be brought to the desired shape by molding or shaping while in the form of dough before curing, or if preferred, a mass or block of the cured material may be brought to the desired shape in a lathe or in any other suitable manner. And further, the form may consist of a core or body of any suitable material as wood or metal and a coating formed of the pyroxylin plastic; or if preferred, the form may be made hollow, it only being essential that the surface with which the rubber solution is in contact should consist of pyroxylin plastic.

It has been found that the finished article will strip as easily from an unlubricated surface formed of pyroxylin plastic, quite as readily as from glass or porcelain surfaces, but unlike glass or porcelain, it is elastic and comparatively tough, and hence not liable to be chipped or broken in handling. And further, as the pyroxylin plastic is not subjected to a high temperature while being cured and hardened, it may be applied as a thin sheet or film on a wooden core, thereby producing a rugged form having the desirable characteristics of glass or porcelain.

It has been attempted to make forms with a wooden or metal core and coat such core with pyroxylin enamel, but it was found that such enamel possessed some characteristics or quality not found in pyroxylin plastic, that would cause the rubber when cured to adhere to the enamel surface, unless a lubricant as glycerine had been applied to the enamel surface before the form was dipped in the rubber solution.

I claim herein as my invention:

1. Means for shaping rubber articles having its shaping surface formed of pyroxylin plastic.

2. A form for rubber balloons or other hollow rubber articles having its surface formed of pyroxylin plastic.

3. A form for rubber balloons or other hollow rubber articles formed of pyroxylin plastic.

In testimony whereof, I have hereunto set my hand.

GEORGE S. STRINGFIELD.